US009690657B2

(12) United States Patent
Iliadis et al.

(10) Patent No.: US 9,690,657 B2
(45) Date of Patent: Jun. 27, 2017

(54) WRITING DATA ACROSS STORAGE DEVICES IN AN ERASURE-CODED SYSTEM

(71) Applicant: International Business Machines Corporation, Armonk, NY (US)

(72) Inventors: Ilias Iliadis, Rueschlikon (CH); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 14/524,382

(22) Filed: Oct. 27, 2014

(65) Prior Publication Data

US 2015/0121169 A1  Apr. 30, 2015

(30) Foreign Application Priority Data

Oct. 31, 2013 (CH) ..................................... 1319286

(51) Int. Cl.
*H03M 13/00* (2006.01)
*G06F 11/10* (2006.01)
(52) U.S. Cl.
CPC .. *G06F 11/1076* (2013.01); *G06F 2211/1009* (2013.01)
(58) Field of Classification Search
CPC ........... G06F 11/1004; H03M 13/6566; H03M 13/09
See application file for complete search history.

(56) References Cited

U.S. PATENT DOCUMENTS

| 6,633,933 | B1* | 10/2003 | Smith | G06F 3/0607 |
| | | | | 710/104 |
| 7,346,831 | B1 | 3/2008 | Corbett | |
| 8,166,370 | B1 | 4/2012 | Tang et al. | |
| 8,316,180 | B2 | 11/2012 | Galloway et al. | |
| 2004/0088485 | A1* | 5/2004 | Shang | G06F 11/1076 |
| | | | | 711/114 |
| 2005/0198447 | A1* | 9/2005 | Corrado | G06F 17/30961 |
| | | | | 711/152 |
| 2012/0030425 | A1* | 2/2012 | Becker-Szendy | G06F 11/1076 |
| | | | | 711/114 |
| 2012/0266011 | A1 | 10/2012 | Storer et al. | |
| 2012/0278689 | A1 | 11/2012 | Tamo et al. | |
| 2012/0297137 | A1 | 11/2012 | Galloway et al. | |

(Continued)

OTHER PUBLICATIONS

Fan et al., "DiskReduce: Replication as a Prelude to Erasure Coding in Data-Intensive Scalable Computing", CMU-PDL-11-112, Oct. 2011.

(Continued)

*Primary Examiner* — Guy Lamarre
(74) *Attorney, Agent, or Firm* — Edward J. Wixted, III

(57) ABSTRACT

A computing device writes data across storage devices in an erasure-coded system. The computing device computes data blocks and parity blocks from data and computes a portion of the data to be stored in the system. The computing is performed by one or more controllers included in a redundant array of an independent disks controller. The computing device provides the locations of the data blocks and the parity blocks in storage devices of an erasure-coded system. The location is determined using one or more placement nodes. The placement nodes are configured for managing placement schemes of data blocks and parity blocks on the storage devices.

16 Claims, 5 Drawing Sheets

(56) References Cited

U.S. PATENT DOCUMENTS

2012/0311255 A1    12/2012    Chambliss et al.
2013/0007572 A1    1/2013    Kotzur et al.

OTHER PUBLICATIONS

Hsieh et al., "An XOR Based Reed-Solomon Algorithm forAdvanced RAID Systems", Proceedings of the 19th IEEE International Symposium on Defect and Fault Tolerance in VLSI Systems (DFT'04), provided on search report on Aug. 7, 2014.

Sapunenko, "Data Protection Technologies: What comes after RAID?", INFN-CNAF HEPiX Spring 2012 Workshop, pp. 1-29, Apr. 24, 2012.

Venkatesan et al., "A General Reliability Model for Data Storage Systems", 2012 Ninth International Conference on Quantitative Evaluation of Systems, 978-0-7695-4781-7/12, © 2012 IEEE, DOI 10.1109/QEST.2012.32, pp. 209-219.

Venkatesan et al., "Effect of Codeword Placement on the Reliability of Erasure Coded Data Storage Systems", K. Joshi et al. (Eds.): QEST 2013, LNCS 8054, pp. 241-257, 2013, copyright Springer-Verlag Berlin Heidelberg 2013.

Venkatesan et al., "Effect of Replica Placement on the Reliability of Large-Scale Data Storage Systems" 2010 18th Annual IEEE/ACM International Symposium on Modeling, Analysis and Simulation of Computer and Telecommunication Systems, pp. 79-88, 1526-7539/10, © 2010 IEEE, DOI 10.1109/MASCOTS.2010.17.

Venkatesan , "Reliability Analysis of Data Storage Systems", Thèse No. 5531 (2012), pp. 1-179.

Venkatesan et al., "Reliability of Clustered vs. Declustered Replica Placement in Data Storage Systems", 19th Annual IEEE International Symposium on Modelling, Analysis, and Simulation of Computer and Telecommunication Systems, pp. 307-317, 1526-7539/11, © 2011 IEEE, DOI 10.1109/MASCOTS.2011.53.

Venkatesan et al., "Reliability of Data Storage Systems under Network Rebuild Bandwidth Constraints", 2012 IEEE 20th International Symposium on Modeling, Analysis and Simulation of Computer and Telecommunication Systems, pp. 189-197.

"PDL Projects", Parallel Data Lab Project: DiskReduce: RAIDing the Cloud, pp. 1-3, © Parallel Data Lab 2014. Last updated Mar. 8, 2012, <http://www.pdl.cmu.edu/DiskReduce/index.shtml>.

"HDFS RAID", pp. 1-7, HDFS-RAID—Hadoop Wiki, <http://wiki.apache.org/hadoop/HDFS-RAID>, provided in main idea on Jun. 11, 2014.

Intellectual Property Office, Application No. 1319286.9, Search Report, Apr. 4, 2014.

* cited by examiner

WRITING DATA ACROSS STORAGE DEVICES IN AN ERASURE-CODED SYSTEM

CROSS REFERENCE TO RELATED APPLICATION

Pursuant to 35 U.S.C. §119, the present application claims priority to United Kingdom Application No. 1319286.9, filed Oct. 31, 2013, the entire contents of which are incorporated herein by reference.

BACKGROUND

The invention relates to the field of computer science, and more specifically, to a computer-method implemented and a system program for writing data across storage devices in an erasure-coded system.

Some data storage systems using RAID (Redundant Array of Independent Disks) employ hardware RAID controllers that compute the parities for a set of user data blocks and store them across a given set of storage devices.

As the system scales out, many RAID controllers are used with each RAID controller assigned to a given set of storage devices. By design, such a system has a clustered placement of the data and parity.

Some systems using RAID are part of a larger class of systems that use erasure codes. For erasure-coded systems, recent research has shown that placement schemes other than clustered (e.g. de-clustered) have significant advantage in terms of reliability when the number of parities in the erasure code is greater than one (e.g. RAID-6, 3-way replication). Placement schemes such as de-clustered placement have been implemented in software for various erasure codes. However, such software implementations may experience severe performance degradation when the system size scales or when the workload increases.

BRIEF SUMMARY OF THE INVENTION

According to one aspect, the invention is embodied as a method for writing data across storage devices in an erasure-coded system. The method comprises computing first data blocks and first parity blocks from first data, which first data is to be stored in the system, wherein said computing is performed by one or more controllers, each of said controllers being a redundant array of independent disks controller, and providing locations of the computed first data blocks and first parity blocks in the storage devices, by using one or more placement nodes, said placement nodes configured for managing placement schemes of data blocks and parity blocks on the said storage devices.

In examples, the method may comprise one or more of the following:
  selecting a placement scheme managed by the one or more placement nodes according to an erasure code used by the one or more controllers;
  providing the locations of the computed first data blocks and first parity blocks further comprises storing the provided locations by the one or more placement nodes in placement metadata, the placement metadata comprising a mapping, for each data block and each parity block, between a logical address space of the block in the system and the physical address space of a block in a storage device;
  transmitting the first data blocks and the first parity blocks to the one or more placement nodes, and storing the transmitted first data blocks and first parity blocks on the identified locations;
  second data to be stored is an update of an already stored first data, further comprising: requesting, by the one or more controllers, the one or more placement nodes for the first data block and first parity blocks to be updated, providing the one or more controllers with the requested first data blocks and first parity blocks to be updated, and computing second data blocks and second parity blocks by modifying the provided first data blocks and first parity blocks according to second data to be updated;
  transmitting the computed second data blocks and second parity blocks to the one or more placement nodes, and storing the second data blocks and second parity blocks on the identified locations;
  before transmitting the computed second data blocks and second parity blocks: identifying, by the one or more placement nodes, locations of the computed second data blocks and second parity blocks in the storage system;
  detecting that one or more storage devices fail; initiating, by the one or more placement nodes, the rebuilding of the data blocks and parity blocks stored on the one or more storage devices that fail;
  initiating the rebuilding of the data blocks and parity blocks comprises: identifying, by the one or more placement nodes, locations of surviving data blocks and parity blocks; retrieving, by the one or more placement nodes, the surviving data blocks and parity blocks stored at the identified locations; transmitting to the one or more controllers the retrieved surviving data blocks and parity blocks; rebuilding lost data blocks and lost parity blocks from the retrieved surviving data bocks and parity blocks According to another aspect, the invention is embodied as erasure-coded system for writing data across storage devices, the system comprising one or more redundant array of independent disks controllers and one or more placement nodes, said placement nodes being configured for managing placement schemes of data blocks and parity blocks on the said storage devices, the system being adapted to perform the method the above method.

In examples, the system may comprise one or more of the following:
  the one or more placement nodes manage de-clustered placement schemes;
  the system comprises at least two controllers that implement different erasure codes;
  the system runs a computer program comprising code means for implementing the one or more placement nodes.

BRIEF DESCRIPTION OF THE DRAWINGS

A system and a process embodying the invention will now be described, by way of non-limiting example, and in reference to the accompanying drawings, where.

DETAILED DESCRIPTION OF THE EMBODIMENTS

Figure 1:
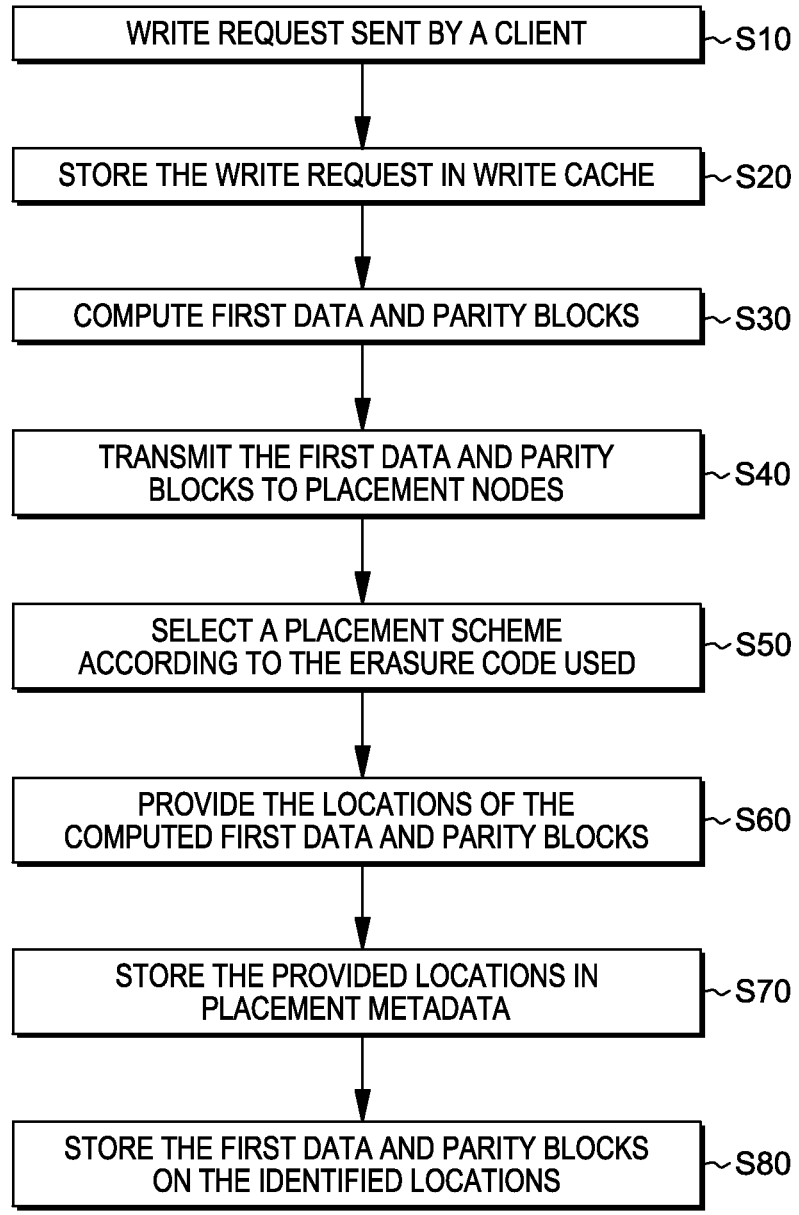
FIG. 1 shows flowchart representing the method.

Referring to the flowchart of FIG. 1, a method for writing data across storage devices in an erasure-coded system is shown. The method comprises computing first data blocks and first parity blocks from first data, which first data is to be stored in the system, wherein said computing is performed by one or more controllers, each of said controllers being a redundant array of independent disks (RAID) controller. The method further comprises providing locations of the computed first data blocks and first parity blocks in the storage devices, by using one or more placement nodes, said placement nodes configured for managing placement schemes of data blocks and parity blocks on the said storage devices. In one embodiment, a placement scheme is a de-clustered placement scheme.

Such a method improves performances of data handling in an erasure-coded system without entailing high development cost. Notably, the proposed method combines the advantages of software and hardware implementations and avoids the disadvantages faced by both. Indeed, the present invention uses RAID controllers for computing data blocks and parity blocks from data (i.e., implementing the erasure code), and uses one or more placement nodes to route the output of the RAID controllers to the different storage devices in the system according to a given placement scheme. By this way, the writing of data in an erasure-coded system is not limited to a given erasure code or placement scheme that is implemented in hardware because, once the hardware is realized, changing the erasure code or the placement scheme is not feasible. Said otherwise, using hardware RAID controllers ensures extremely fast parity computation during writes and updates to the storage system, and by routing the output of the RAID controllers using placement nodes, the placement of the data and parity blocks can be made in software. This advantageously allows to optimize the placement of data and parity blocks across all the storage devices in the system to balance cost, performance, and reliability.

At step S10, a write request is sent by a computer client for storing data in an erasure-coded system. The write request is received by at least one RAID controller. The term RAID controller means a device which manages physical storage devices (e.g. disk drives) and presents them to the computer as logical units. A RAID controller is therefore a piece of hardware (a physical object, e.g., a processor) that stores instructions and carry out these instructions. The term write request means that a client of the erasure-coded system sent data to be stored on the system. The term data refers to quantities, characters, or symbols on which operations are performed by a computer. For instance, in one embodiment and scenario, the client requests to write a file to the system.

Figure 5:
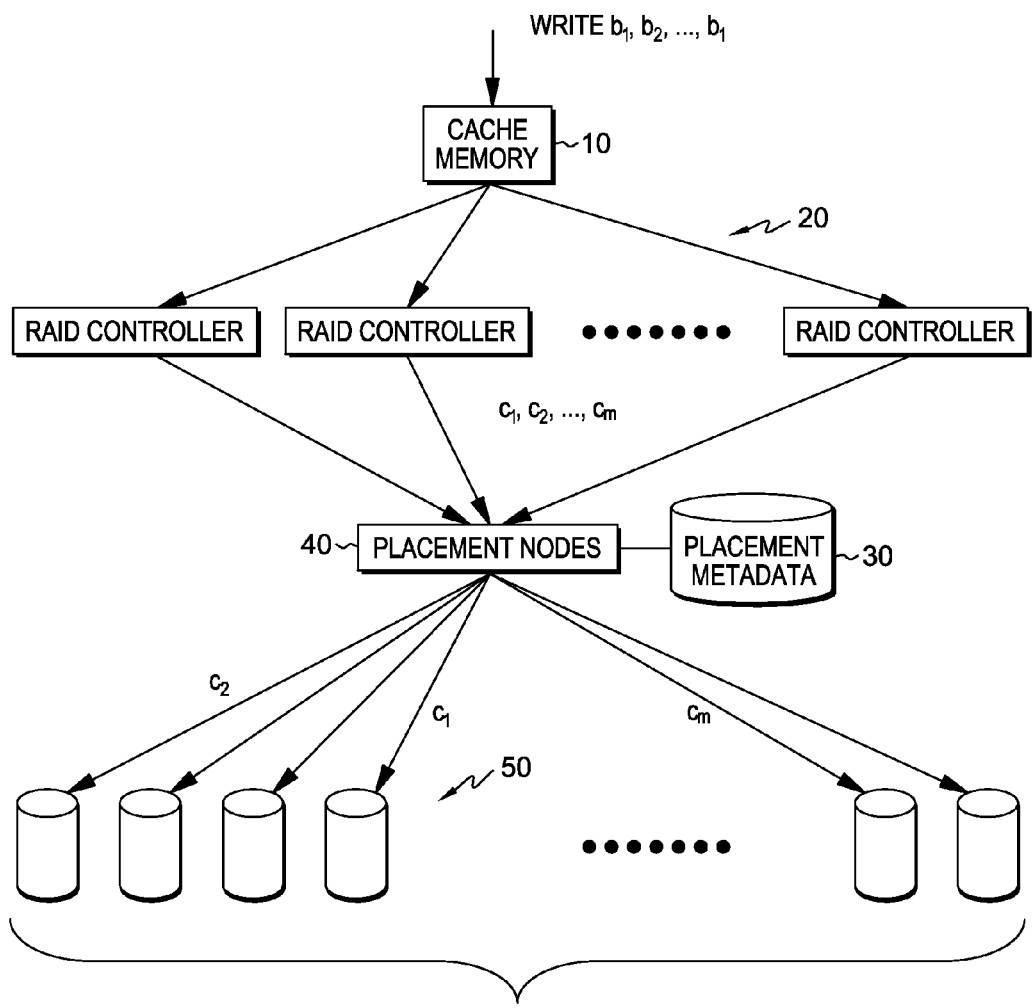
FIG. 5 illustrate an example of a system performing the method.

In practice, the write request is received by a cache memory 10, as illustrated on FIG. 5. The cache memory acts as a buffer wherein write, update, delete requests are temporarily stored (step S20) until a RAID controller is available for handling the request.

Then, at step S30, the data of the write request has been transmitted from the write cache to one or more RAID controllers. In practice the write request is processed by one RAID controller, that is, one RAID Controller among several RAID controllers computes data blocks (denoted as "first data" in FIG. 1) and parity blocks from the data to be stored in the system.

The data blocks and parity blocks are the result of transformation performed by the RAID controller on the data to be stored: the RAID controller has encoded the data to be stored on the system. The term block means one or more bits of data. The term parity block means one or more bits of data for error detection and correction on the said one or more data blocks. In one embodiment, the data and parity blocks form one block of data. For example, the parity block is placed at the end of the data block. It is to be understood that, in certain embodiments, the number of data blocks and parity blocks vary depending on the erasure-code used for encoding the data. For example, there is one parity block for several data blocks.

The encoding of the data by the RAID controller is part of erasure-coding that is a method of data protection in which data is broken into fragments, expanded and encoded with redundant data pieces and stored across a set of different locations, such as disks, storage nodes or geographic locations. For example, in one embodiment, the proposed method is used for, but is not limited to, maximum distance separable (MDS) erasure codes.

Referring now to the system represented on FIG. 5, it comprises several RAID controllers 20 that only carry out encoding and decoding operations and at least two different RAID controllers implement different levels of redundancy, i.e., different erasure codes.

Referring back to FIG. 1 at step S40, the data and parity blocks are transmitted to one or more placement nodes. A placement node is software that manages placement schemes of data and parity blocks across storage devices. The term software means a set of computer-readable instructions that are executed by a computer processor, which performs operations as a result of the execution of the instructions. Typically, a placement node is computer program. The transmission of data and parity blocks to one or more placement nodes involves that the blocks, originally managed by the RAID controller(s), are managed by the placement node(s). The term placement scheme means block placement strategies on the storage devices of the system. Typically, a placement scheme will determine locations of storage devices on which parity blocks will be stored. In practice, in one embodiment, the data and parity blocks are transmitted to one placement node.

In one embodiment, several placement schemes are contemplated, such as clustered or de-clustered placement schemes. For instance, one considers a storage system using an (l,m)-MDS erasure code. In one embodiment, each set of l user data blocks is mapped to a set of m data blocks, called code-word, in such a way that any l blocks of the code-word are used to recover the l user data blocks. Such a code-word can survive a loss of up to m−l code-word blocks. Examples of such erasure codes are replication (where l=1, m=r, for r-way replication), RAID-5 (where m−l=1), RAID-6 (where m−l=2), and Reed-Solomon codes. Once a set of l user data blocks have been encoded into a code-word of m blocks, these m blocks need to be stored on m of the n storage devices of the system. In large-scale data storage systems, the value of m is typically much smaller than the value of n. Therefore, in one embodiment, there exists a large number of possible ways in which a code-word of length m is placed in a system with n disks.

Figure 4:
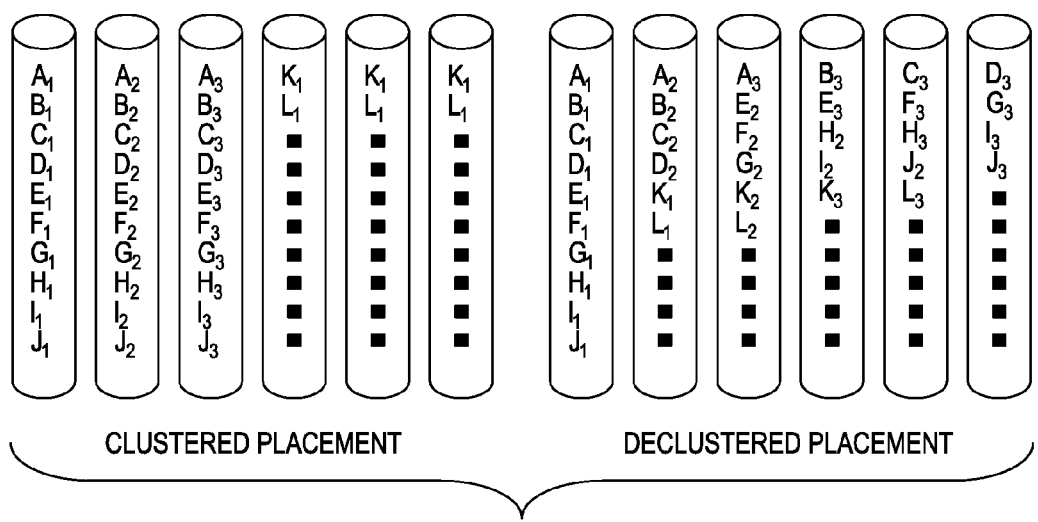
FIG. 4 illustrate example of clustered and de-clustered placements.

Referring now to FIG. 4, it is exemplified clustered and de-clustered placement schemes. In clustered placement, the n disks are divided into disjoint sets of m disks called clusters, and each code-word is placed in one of these clusters. In FIG. 4, n=6 disks are divided into 2 clusters of m=3 disks. In de-clustered placement scheme, each of the n-choose-m possible ways of placing a code-word is used equally in storing the code-words across all the disks. In FIG. 4, the de-clustered placement scheme is shown for m=3 and n=6.

Referring back to FIG. 1, once the data and parity blocks have been transmitted to at least one placement node (step S40), the placement node(s) selects a placement scheme at step S50. As the data blocks and their corresponding parity blocks can be placed on any set of storage devices in the system according to a pre-determined placement scheme selected by the placement node(s), this advantageously avoids to divide the storage devices in the system into distinct parity groups (with potentially different levels of redundancy), and data blocks and their corresponding parity block are not placed in one of these groups.

In one embodiment, the selection of a placement scheme is carried out according to the erasure code that is used by RAID controller(s) having carried out data encoding. By allowing the system to use a placement policy for an incoming data to be stored on the system in accordance with a given erasure code, the system's reliability is significantly enhanced.

In one embodiment, there is one placement node associated with one RAID controller. The system therefore comprises a set of RAID controller/placement node couples. The placement node therefore does not perform a selection (S50) of a placement scheme among several placement schemes in as much as the placement node which erasure-code will be used.

Then, at step S60, locations for the computed data and parity blocks in the storage devices are provided. The term location means a physical address in the storage device. The placement nodes know the complete logical address space of the system. In one embodiment, this knowledge is provided to the placement nodes with placement metadata. The placement metadata comprises a mapping, for each data block and parity block, between the logical address space of the block in the system and the physical address space of the block in a storage device.

Typically, in one embodiment, the placement metadata is stored on a database 30, as shown on FIG. 5. In one embodiment, the database is installed on the computer system that runs the placement node(s). Alternatively, in another embodiment, the database is installed on dedicated computer system. Hence, in various embodiments, placement nodes 40 will locally or remotely access the placement metadata.

Back to the flowchart of FIG. 1, at step S70, the identified locations in the logical address are stored in placement metadata by the placement nodes so that information regarding the logical address space is maintained up to date. Hence, the placement metadata comprises a new entry for each new block to be written on the storage devices.

Then, at step S80, data and parity blocks are stored on the identified locations on the system. At this stage of the method, the write request has been fulfilled.

Figure 2:
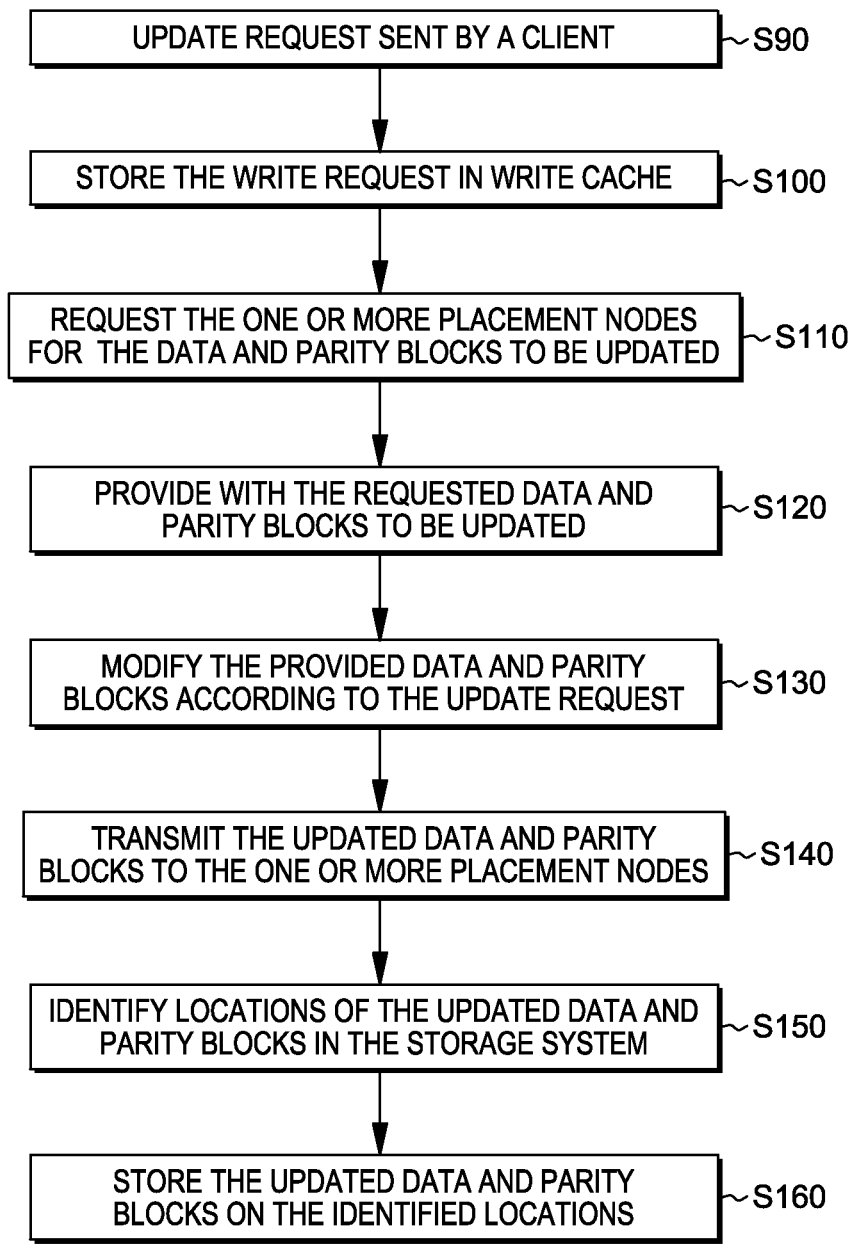
FIGS. 2 and 3 show flowchart representing examples of the system.

Referring now to FIG. 2, it is exemplified an update request; second data to be stored is an update of an already stored first data, e.g., the data stored in the erasure-coded system in reference to FIG. 1.

At step S90, an update request is sent by a computer client for updating data in the erasure-coded system. The update request is received by at least one RAID controller. In practice, the update request is received by and stored in (step S100) cache memory 10 illustrated on FIG. 5.

Next, at step S110, the one or more RAID controllers request to one or more placement nodes for the data and parity blocks that need to be updated. To this aim, the placement node(s) perform a search in the placement metadata in order to identify the corresponding locations of the data and parity blocks; then, the placement node(s) deliver the requested blocks to the RAID controller, at step S120.

In one embodiment and scenario, in the event the RAID controller that receives the update request implements a level of redundancy different from the one used for storing the blocks to be updated, the placement node(s) selects another RAID controller implementing the initial level of redundancy. In this case, the selected RAID controller is will handle the update. Alternatively, the RAID controller having received the update request will handle the request anyway.

Then, at step S130, the RAID controller that handles the update request computes data block and parity blocks by modifying the data and parity blocks provided at step S120. The modification is carried out in accordance with the data of the update request, as known in the art.

Once the updated data and parity blocks have been encoded by the RAID controller, the latter transmits (step S140) the updated data and parity blocks to the one or more placement nodes, e.g., to the placement nodes having delivered the requested blocks at step S120. It is to be understood that the placement nodes of steps S120 and S140 are different in certain embodiments.

Then, at step S150, the placement node that receives the updated blocks provides locations in the storage devices for the updated data and parity blocks. The identification of the locations is performed as described in reference to step S60.

Next, at step S170, the updated data and parity blocks are stored on the identified locations. The update request is therefore completed.

Figure 3:
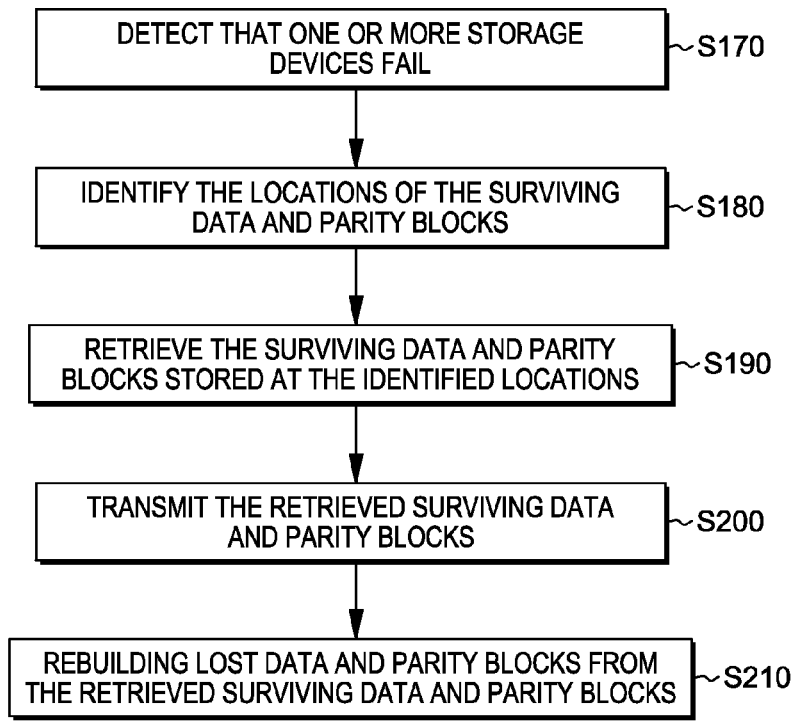

Referring now to FIG. 3, it is exemplified an update request; second data to be stored is an update of an already stored first data, e.g., the data written in the erasure-coded system in reference to FIG. 1 or updated in the erasure-coded system in reference to FIG. 2.

At step S170, it is detected the failure of one or more storage devices, that is, data and parity blocks stored on the storage device(s) cannot be accessed anymore. These blocks are thus considered as being lost.

The rebuilding of the data and parity blocks stored on the one or more storage devices that fail is initiated. In one embodiment and scenario, the decision to rebuild lost block is triggered upon user action, or by the system.

The rebuilding is performed as follows. At step S180, the locations of the surviving data and parity blocks are identified. This is performed by one or more placement nodes. For example, in one embodiment, one placement node identifies, in the placement metadata, the logical address spaces of the one or more failing storage devices, and therefore identifies the surviving blocks that are stored on the logical address spaces that were not affected by the failure.

Once the surviving block are identified, the placement node(s) retrieve (step S190) the surviving data and parity blocks from the identified locations and transmit (step S200) these retrieved blocks to one or more RAID controller responsible for rebuilding lost data, as known in the art. It is to be understood that a placement node will transmit to the RAID controller only surviving blocks encoded with the erasure-code it implements.

Then, lost data and parity blocks are rebuilt blocks after blocks from the retrieved surviving data and parity blocks, at step S210.

The computed blocks are then stored on one or more storage devices replacing the storage device(s) that fail. This is carried out as discussed in reference to steps S70 and S80.

Figure 6:
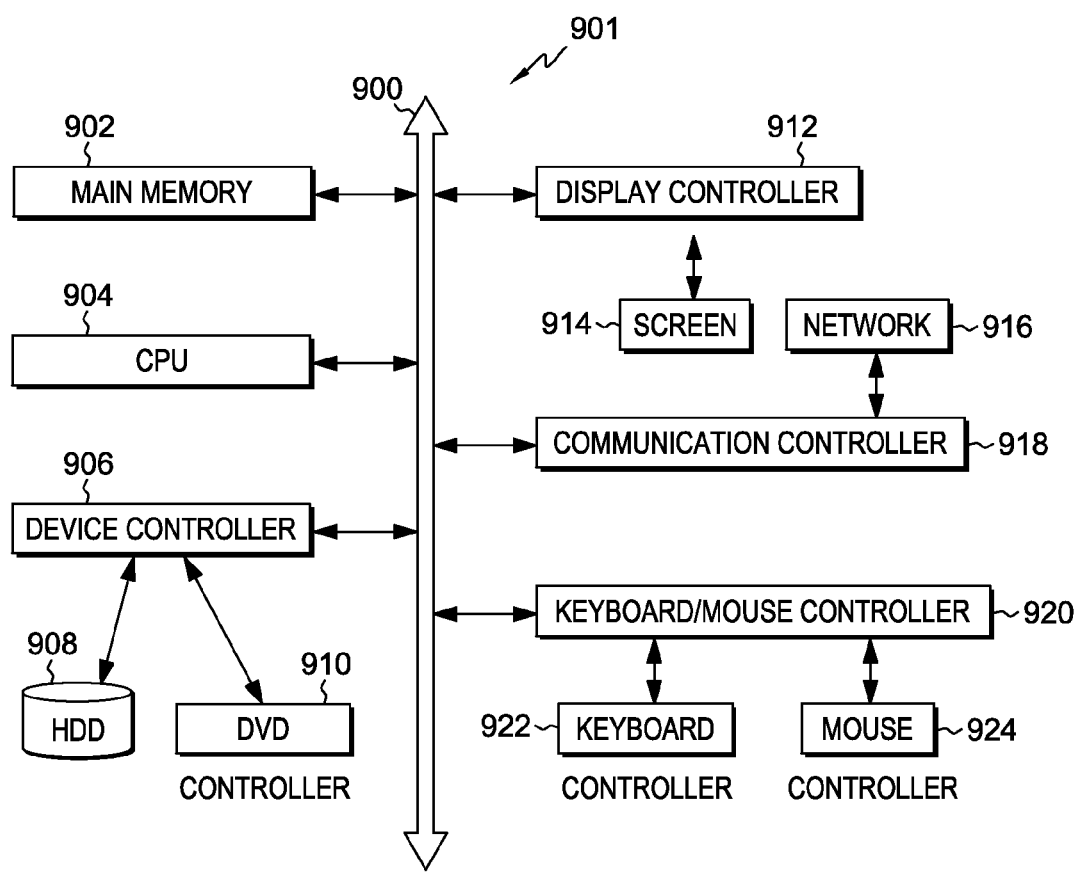
FIG. 6 shows an example of computer system.

FIG. 6 is a block diagram of computer system according to an embodiment of the invention, suitable for implementing placement nodes and/or storing and managing the placement metadata; for example if placement metadata are stored on a database running on the computer. A computer system (901) according to an embodiment of the invention includes a CPU (904) and a main memory (902), which are connected to a bus (900). The bus (900) may be connected to a display controller (912) which is connected to a screen (914) such as an LCD monitor. The display (914) may be used to display information about a computer system. The bus (900) is also connected to a storage device such as hard disk (908) or DVD (910) through a device controller (906) such as an IDE, SATA and controllers. The computer system may be further suitable for hosting several RAID controllers (906) used for performing the method according to the invention; the RAID controller are typically connected to the bus (900). The bus (900) may be further connected to a keyboard (922) and a mouse (924) through a keyboard/mouse controller (920) or a USB controller (not shown). The bus may be also connected to a communication controller (918) conforms to, for example, an Ethernet (registered trademark) protocol. The communication controller (918) may be used to physically connect the computer system (901) with a network (916).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for writing data across storage devices in an erasure-coded system, the method comprising:
computing, by a computing device, first data blocks from a first data set and first parity blocks from a portion of the first data set to be stored in the system, wherein said computing is performed by one or more controllers, each of said controllers being a redundant array of an independent disks controller;
transmitting, by the computing device, the first data blocks and the first parity blocks to a cache;
receiving, by the computing device from one or more placement nodes, locations of the first data blocks and the first parity blocks in a plurality of storage devices included in an erasure-coded system, wherein the one or more placement nodes are configured to read the first data blocks and the first parity blocks from the cache, and wherein the placement nodes are configured to manage placement schemes of data blocks and parity blocks on said storage devices; and
storing, by the computing device, the provided locations based on the one or more placement nodes in a placement metadata, the placement metadata comprising a mapping for one or more of the first data blocks and one or more of the first parity blocks between a logical address space of a block in the system and a physical address space of the block in a storage device.

2. The method of claim 1, further comprising:
selecting, by the computing device, a placement scheme managed by the one or more placement nodes according to an erasure code used by the one or more controllers.

3. The method of claim 1, further comprising:
storing, by the computing device, a second data that is an update of an already stored first data.

4. The method of claim 3, wherein the storing comprises:
requesting, by the one or more controllers of the computing device the one or more placement nodes for the first data blocks and first parity blocks to be updated;
providing, by the computing device, the one or more controllers with the first data blocks and first parity blocks to be updated; and
computing, by the computing device, one or more second data blocks and second parity blocks by modifying the first data blocks and first parity blocks based, at least in part, on the second data.

5. The method of claim 4, further comprising:
transmitting, by the computing device, the one or more second data blocks and second parity blocks that were computed to the cache;
receiving, by the computing device from the one or more placement nodes, locations of the one or more second data blocks and the second parity blocks; and
storing, by the computing device, the one or more second data blocks and the second parity blocks on the identified locations.

6. The method of claim 5, further comprising:
identifying, by the computing device, by the one or more placement nodes, locations of the one or more second data blocks and second parity blocks in the erasure-coded system before transmitting one or both of the one or more second data blocks and second parity blocks.

7. The method of any of claim 1, further comprising:
detecting, by the computing device, that one or more storage devices included in the plurality of storage devices included in the erasure-coded system have failed; and
initiating, by the computing device, using the one or more placement nodes, the rebuilding of the data blocks and parity blocks stored on those one or more storage devices that failed.

8. The method of claim 7, wherein initiating the rebuilding of the data blocks and parity blocks comprises:
identifying, by the computing device, using the one or more placement nodes, locations of surviving data blocks and parity blocks;
retrieving, by the computing device, using the one or more placement nodes, the surviving data blocks and parity blocks stored at the identified locations;
transmitting, by the computing device, the retrieved surviving data blocks and parity blocks to the one or more controllers; and
rebuilding, by the computing device, lost data blocks and lost parity blocks based, at least in part, on the retrieved surviving data bocks and parity blocks.

9. An erasure-coded system for writing data across storage devices, the system comprising:
one or more redundant array of independent disks controllers;
one or more placement nodes, said placement nodes being configured for managing placement schemes of data blocks and parity blocks on the said storage devices;
one or more computer processors;
one or more computer readable storage medium;

program instructions stored on the computer readable storage medium for execution by at least one of the one or more processors, the program instructions comprising:

program instructions to compute first data blocks from a first data set and first parity blocks from a portion of the first data set, to be stored in the system, wherein said computing is performed by one or more controllers, each of said controllers being a redundant array of an independent disks controller;

program instructions to transmit the first data blocks and the first parity blocks to a cache;

program instructions to receive locations of the first data blocks and the first parity blocks in a plurality of storage devices included in an erasure-coded system from one or more placement nodes, wherein the one or more placement nodes are configured to read the first data blocks and the first parity blocks from the cache, and wherein the placement nodes are configured to manage placement schemes of data blocks and parity blocks on said storage devices; and program instructions to store the provided locations based on the one or more placement nodes in a placement metadata, the placement metadata comprising a mapping for one or more of the first data blocks and one or more of the first parity blocks between a logical address space of a block in the system and a physical address space of the block in a storage device.

10. The system of claim 9, wherein the one or more placement nodes manage a declustered placement scheme.

11. The system of claim 9, wherein the system comprises at least two controllers that implement different erasure codes.

12. The system of claim 9, wherein the system runs a computer program comprising code means for implementing the one or more placement nodes.

13. The system of claim 9, the program instructions further comprising:

program instructions to select a placement scheme managed by the one or more placement nodes according to an erasure code used by the one or more controllers.

14. A computer program product for writing data across storage devices, the computer program product comprising:

one or more computer-readable storage media, wherein the computer readable storage media is not transitory per se, and program instructions stored on the one or more computer-readable storage media executable by a computer processor, the program instructions comprising:

program instructions to compute first data blocks from a first data set and first parity blocks from a portion of the first data set, to be stored in the system, wherein said computing is performed by one or more controllers, each of said controllers being a redundant array of an independent disks controller;

program instructions to transmit the first data blocks and the first parity blocks to a cache;

program instructions to receive locations of the first data blocks and the first parity blocks in a plurality of storage devices included in an erasure-coded system from one or more placement nodes, wherein the one or more placement nodes are configured to read the first data blocks and the first parity blocks from the cache, and wherein the placement nodes are configured to manage placement schemes of data blocks and parity blocks on said storage devices; and program instructions to store the provided locations based on the one or more placement nodes in a placement metadata, the placement metadata comprising a mapping for one or more of the first data blocks and one or more of the first parity blocks between a logical address space of a block in the system and a physical address space of the block in a storage device.

15. The computer program product of claim 14, the program instructions further comprising:

program instructions to select a placement scheme managed by the one or more placement nodes according to an erasure code used by the one or more controllers.

16. The computer program product of claim 14, the program instructions further comprising:

program instructions to store a second data that is an update of an already stored first data.

* * * * *